3,470,165
Patented Sept. 30, 1969

3,470,165
FUROCHROMONE DERIVATIVES
Colin Fitzmaurice, Holmes Chapel, England, assignor to Benger Laboratories Limited, Holmes Chapel, England
No Drawing. Filed July 9, 1963, Ser. No. 293,874
Claims priority, application Great Britain, July 10, 1962, 26,404/62, 26,405/62
Int. Cl. C07d 7/36, 5/40
U.S. Cl. 260—240                                                 8 Claims The present invention relates to new chemical compounds.

It has been found that the new chromone derivatives as hereinafter defined possess special activity as brochodilator, anti-anaphylactic or spasmolytic agents.

According to the invention there are provided as new compounds, furochromone derivatives of the general formula:

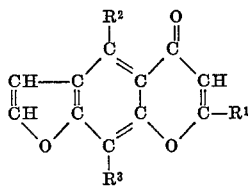

in which $R^1$ is an o-, m- or p-carboxyphenyl group; an o-, m- or p-carboxyphenylalkylene group of the formula:

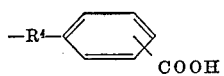

in which $R^4$ is a saturated or unsaturated group (for example a vinylene group); a 2-, 3- or 4-pyridyl group; or a 2-, 3- or 4-pyridylalkylene group of the formula:

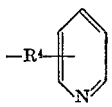

in which $R^4$ has the meaning defined above; $R^2$ is a hydroxy, lower alkoxy (for example, methoxy or ethoxy), substituted aminoalkoxy (for example, diethylaminoethoxy) or carboxyalkoxy ($HO_2C(CH_2)_nO$—) (for example, carboxymethoxy) group; and $R^3$ is a hydrogen atom or a lower alkoxy (for example, methoxy) group; and salts and functional derivatives of those compounds in which $R^1$ contains a carboxyl group and acid addition salts and quaternary derivatives (for example, obtained by reaction with a lower alkyl halide or sulphate) of those compounds in which $R^1$ is or contains a pyridyl group.

The salts of the furochromone derivatives according to the present invention in which $R^1$ contains a carboxyl group which may be mentioned include metal, for example alkali metal, or ammonium salts. These salts are more water soluble than the free acid. Functional derivatives of such furochromone derivatives which may be mentioned include esters and amides, for example lower alkyl esters or amides with carboxyamines of the formula: $NH_2R^5COOH$, where $R^5$ is an alkylene radical, such as glycine.

The compounds according to the invention have bronchodilator and/or spasmolytic activity.

In vitro experiments show that some compounds have greater spasmolytic activity than khellin against histamine and mecholine when tested on the guinea-pig tracheal chain and ileum. Some of the compounds show activity against histamine spasm in the anaesthetised cat. Table I shows the extent of these activities in comparison with khellin for compounds in which $R^1$ is carboxyphenyl or carboxyphenylalkylene.

TABLE I

| Compound | In vitro experiments (guinea-pig) | | | | In vivo experiments histamine spasm (cat) |
|---|---|---|---|---|---|
| | Tracheal chain | | Ileum | | |
| | Histamine | Mecholine | Histamine | Mecholine | |
| Khellin | 100 | 100 | 100 | 100 | 100 |
| A | 300 | 150 | 250 | 180 | 110 |
| B | 300 | 75 | 180 | 130 | 87 |
| C | 300 | 250 | | | 100 |

Wherein A, B and C are compounds of the above formula in which:

Compound A: $R^1$ is p-carboxyphenyl; $R^2=R^3=$methoxy
Compound B: $R^1$ is p-carboxyphenylvinyl; $R^2=R^3$ =methoxy
Compound C: $R^1$ is p-carboxyphenyl; $R^2$ is hydroxy; $R^3$ is methoxy.

Table II shows the in vitro brochodilator activity of some compounds in which $R^1$ is a pyridyl or pyridylalkylene group taking the activity of khellin to be 100.

TABLE II

| $R^1$ | $R^2$ | $R^3$ | Bronchodilator activity |
|---|---|---|---|
| Pyrid-2-yl, hydrochloride | Methoxy | Methoxy | 425 |
| Pyrid-3-yl, hydrochloride | do | do | 425 |
| Pyrid-4-yl, hydrochloride | do | do | 275 |
| 2-pyrid-2-ylvinyl, hydrochloride | do | do | 185 |
| 2-Pyrid-3-ylvinyl, hydrochloride | do | do | 140 |
| 2-Pyrid-4-ylvinyl, hydrochloride | do | do | 130 |
| Pyrid-4-yl, methobromide | do | do | 90 |
| Pyrid-4-yl ethiodide | do | do | 90 |

Some of the furochromones, for example those in which $R^1$ is carboxyphenyl or carboxyphenylalkylene, also exhibit anti-anaphylactic activity. This was demonstrated in human volunteers who suffer from specific allergic asthma by administering the compound as an aerosol 10 minutes before the antigen to which they are sensitive. The degree of protection afforded by the compound against an asthmatic attack is measured by repeated estimation of the reduction of air way resistance. A suitably designed spirometer was used to measure the forced expiratory volume at one second ($F.E.V._{-1.0}$). The activity of the compound is expressed as follows:

Percent protection=10×

$$\left[\frac{\text{Av. max. percent } F.E.V._{-1.0} - \text{Max. percent } F.E.V._{-1.0}}{\text{fall control shock} \quad \text{fall test shock}}\right]$$
$$\overline{\text{Av. max. percent } F.E.V._{-1.0} \quad \text{fall control shock}}$$

for example, the sodium salt of 2-(4-carboxyphenyl)5,8-dimethoxyfuro[3,2-g]chromone gave 25% protection when inhaled as a 0.5% aerosol (estimated dose inhaled 0.1 mg.).

Accordingly one embodiment of the invention is for a pharmaceutical composition which contains a furochromone derivative as defined above or a salt, functional derivative, acid addition salt or quaternary derivative thereof and a pharmaceutically acceptable carrier. The pharmaceutically acceptable carrier may be liquid or solid. The carrier may be for example suitable for the preparation of tablets or the like, or suitable for the preparation of solutions for injection, or suitable for the preparation of aerosols.

The compounds according to the invention may be prepared in any convenient manner.

Thus according to one embodiment of the invention the compounds in which $R^1$ is a carboxyphenyl, esterified carboxyphenyl or pyridyl group may be prepared by condensing a compound of the formula:

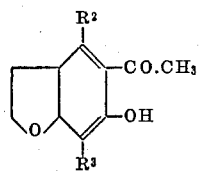

in which $R^2$ and $R^3$ have the meaning defined above (for example khellinone or visnaginone) with an ester of the formula $R^5.COOR^6$ in which $R^5$ is an esterified o-, m- or p-carboxyphenyl group, or a 2-, 3- or 4-pyridyl group and $R^6$ is an alkyl, preferably a methyl group, in the presence of a condensing agent such as sodium or sodium hydride, and subsequently cyclising the resulting diketone, Suitable compounds of the formula $R^5.COOR^6$ include, for example, dimethyl terephthalate, dimethyl isophthalate, dimethyl phthalate and methyl picinolate.

The diketone may be cyclised by heating with sulphuric acid to yield, where $R^1$ is carboxyphenyl, the ester which may, if desired, be subsequently hydrolysed to the acid with methanolic sodium hydroxide. Alternatively the diketone may be cyclised by heating with a mixture of glacial acetic acid and concentrated hydrochloric acid in which case where $R^1$ is carboxphenyl the free acid is obtained.

The condensation is conveniently carried out in the presence of a solvent such as pyridine.

According to a further embodiment of the invention there is provided a process for the preparation of those compounds in which $R^1$ is a carboxyphenylvinyl or pyridylvinyl group which comprises condensing a compound of the formula:

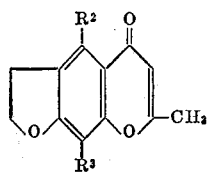

(for example khellin or visnagin) in which $R^2$ and $R^3$ have the meanings defined above, with an aldehyde of the formula:

$R^7.CHO$ in which $R^7$ is a carboxyphenyl or pyridyl group in a solvent, for example methanol, in the presence of a sodium alkoxide, for example sodium methoxide.

Hydochlorides of the compounds, in which $R^1$ is a pyridyl or pyridylalkylene group, may be prepared by passing hydrogen chloride gas into a benzene solution. The quaternary salts may be prepared by heating a benzene solution of the base with an alkyl halide, under pressure.

The following examples are given to illustrate the present invention; the parts and percentages are by weight unless otherwise indicated.

Example 1

A solution of 20 parts of khellinone and 20 parts of dimethyl terephthalate in 100 parts of pyridine was treated with 10 parts of sodium hydride. When the vigorous evolution of hydrogen had ceased, the mixture was heated on a steam bath for about twelve hours, and then poured into dry ether to precipitate the crude sodium salt of the diketone. This was filtered off and washed free from pyridine with more ether. The excess sodium hydride was carefully decomposed by adding a small volume of ethanol and then the solid was dissolved in cold water. After filtering, if necessary, the crude diketone was precipitated by the addition of dilute hydrochloride acid, filtered and washed free from acid. The diketone was cyclised by dissolving it, with cooling, in about 100 parts of concentrated sulphuric acid, warming it to about 60° C. for five minutes and then pouring it into a large volume of cold water. The precipitate was filtered, washed, dried and recrystallised from glacial acetic acid to obtain the methyl ester of 2-(4-carboxyphenyl)5,8-dimethoxyfuro[3,2 - g]chromone as fine yellow crystals melting with darkening between 290° C. and 295° C. An insoluble residue is usually obtained which does not melt below 320° C. and probably consists of two norkhellin nuclei joined in the 2-position by a benzene ring. The methyl ester was converted to the free acid by refluxing it for several hours in methanol containing a small excess of sodium hydroxide. After removing most of the alcohol the residue was dissolved in water, filtered and then acidified with dilute hydrochloric acid. The precipitated acid was filtered, washed and dried, and recrystallised from glacial acetic acid, to give 2-(4-carboxyphenyl)5,8 - dimethoxyfuro[3,2-g]chromone as a yellow solid melting between 292° C. and 294° C.

*Analysis.*—$C_{20}H_{14}O_7$ requires: C, 65.6%; H, 3.8%. Found: C, 65.2%; H, 3.9%.

The sodium salt was formed by warming the acid with an equivalent amount of sodium hydroxide in water, filtering any slight turbidity and freeze-drying the solution to obtain a yellow powder easily soluble in cold water to give a neutral solution.

Example 2

The diketone obtained from 10 parts of khellinone and 10 parts of dimethyl terephthalate was dissolved in 150 parts of boiling glacial acetic acid and then 35 parts of concentrated hydrochloric acid where added and the mixture was boiled for a further ten minutes, cooled and poured into 2000 parts of cold water. The resulting crude ester was recrystallised from chloroform, hydrolysed with alcoholic sodium hydroxide and the acid precipitated. The crude acid, on recrystallisation from glacial acetic acid gave two products, one, the more soluble, being identical with that obtained in Example 1. The other, which was almost insoluble in acetic acid, was recrystallised from ethanol and gave a yellow solid melting between 299° C. and 302° C. This gave a green colour with alcoholic ferric chloride and appeared to be 2-(4-carboxyphenyl)5-hydroxy-8-methoxyfuro[3,2-g]chromone.

*Analysis.*—$C_{19}H_{12}O_7$ requires: C, 64.8%; H, 3.6%. Found: C, 64.8%; H, 3.4%.

Example 3

4.5 parts of teraphthaldehydic acid and 7.8 parts of khellin were dissolved together in 100 parts of anhydrous methanol, with warming, in a flask fitted with a reflux condenser and drying tube. To this solution was added a solution of 3.4 parts of sodium in 80 parts of anhydrous methanol, and the mixture was refluxed for two hours. The yellow precipitate of the sodium salt of 2-[2-(4-carboxyphenyl)vinyl] - 5,8 - dimethoxyfuro - [3,2-g]chromone amounting to 9.3 parts (yield 74.8%) was filtered and washed with methanol until free from any trace of red colour and dried in vacuo.

*Analysis.*—$C_{22}H_{15}O_7Na$ requires: Na, 5.55%; equivalent weight 414. Found: Na, 5.55%; equivalent weight 415.

Example 4

0.8 part of methyl isophthaldehydate and 1.3 parts of khellin were dissolved together in 20 parts of anhydrous methanol and treated with a solution of 0.7 part of sodium in 15 parts of methanol. After a few minutes a yellow solid began to form. The mixture was refluxed for three hours and then filtered. The yellow solid was washed with methanol when part of it dissolved. The yellow residue amounting to 0.3 part (melting point 215–218° C.) was insoluble in water, acid or alkali and was the methyl ester of 2-[2-(2-carboxyphenyl)vinyl]-5,8-dimethoxyfuro [3,2-g]chromone.

*Analysis.*—$C_{23}H_{18}O_7$ requires: C, 68.0%; H, 4.4%. Found: C, 68.1%; H, 4.3%.

The filtrate from this was concentrated and cooled to obtain 0.55 part of the yellow crystals of the sodium salt of 2 - [2 - (3 - carboxyphenyl)vinyl] - 5,8-dimethoxyfuro [3,2-g]chromone.

*Analysis.*—$C_{22}H_{15}O_7Na$ requires: Na, 5.55%; equivalent weight 414. Found: Na, 5.53%; equivalent weight 413.

Example 5

1.4 parts of methyl picolinate and 2.4 parts of 5-acetyl-4,7-dimethoxy - 6 - hydroxybenzo-[b] furan (khellinone) were dissolved in 5 parts of anhydrous pyridine and treated with 0.8 part of sodium hydride. The mixture was heated on a water bath for four hours and then diluted with ether. The precipitate was filtered, washed with ether, dissolved in water and acidified with acetic acid to obtain the diketone as an oily solid. This was dissolved in a little concentrated sulphuric acid, warmed at 60° C. for five minutes and poured on to ice. The solution was neutralised with ammonia and filtered. The solid was extracted with 50% hydrochloric acid and the solution again precipitated with ammonia. The solid was recrystallised from benzene to obtain 0.7 part of 5,8-dimethoxy-2-pyrid-2-yl-furo-[3,2-g]-chromone, melting point 180–181° C.

*Analysis.*—$C_{18}H_{13}O_5N$ requires: C, 66.9%; H, 4.02%; N, 4.33%. Found: C, 66.2%; H, 4.08%; N, 4.38%.

A benzene solution of the base when heated with an excess of methyl bromide in a sealed tube at 100° C. for 75 hours gave a 20% yield of the methobromide as buff coloured crystals, melting point 212–214° C.

Example 6

4.72 parts of methyl nicotinate, 2.72 parts of khellinone and 1.5 parts of sodium hydride were reacted together in pyridine as in Example 5 to obtain 5,8-dimethoxy-2-pyrid-3-yl furo[3,2-g]-chromone, melting point 215° C.

*Analysis.*—$C_{18}H_{13}O_5N$ requires: C, 66.9%; H, 4.02%; N, 4.33%. Found: C, 67.1%; H, 3.90%; N, 4.17%.

Example 7

2.6 parts of khellin and 1.1 parts of pyridine-2-aldehyde, dissolved in 25 parts of boiling methanol, were treated with a solution of 0.5 part of sodium in 10 parts of methanol. After being refluxed for three hours the solution was cooled and the yellow crystals were filtered and washed with a little methanol. This was recrystallised from methanol to obtain 1.8 parts of 5,8-dimethoxy-2(2-pyrid-2-ylvinyl) furo[3,2-g]chromone, melting point 210–211° C.

*Analysis.*—$C_{20}H_{15}O_5N$ requires: C, 68.8%; H, 4.3%; N, 4.01%. Found: C, 68.8%; H, 4.1%; N, 3.96%.

A solution of the base in benzene when treated with hydrogen chloride gas gave the hydrochloride as a light orange solid, melting point 223–224° C.

Example 8

2.6 parts of khellin and 1.1 parts of pyridine-4-aldehyde when treated as in Example 7 gave 2 parts of 5,8-dimethoxy-2-(2 - pyrid - 4 - ylvinyl)furo[3,2-g]chromone, melting point 239° C.

*Analysis.*—$C_{20}N_{15}NO_5$ requires: C, 68.8%; H, 4.3%; N, 4.01%. Found: C, 68.6%; H, 3.96%; N, 4.11%.

The hydrochloride was obtained as in Example 3 as a light orange solid, melting point 245–247° C.

Example 9

5 parts of visnaginone were reacted with 5 parts of dimethyl terephthalate and 1 part of sodium hydride, exactly as described in Example 1, except that the cyclisation was effected in phosphoric acid instead of sulphuric acid to obtain 5.6 parts of the crude methyl ester of 2-(4-carboxyphenyl)-5-methoxyfuro[3,2-g]chromone. Without further treatment this was suspended in 100 parts of boiling dioxan, treated with a solution of 1.5 parts sodium hydroxide in methanol and heated under reflux for two hours. The solid was filtered, dissolved in water, and the solution filtered and acidified to obtain 4.6 parts 2-(4-carboxyphenyl)-5-methoxyfuro[3,2-g]chromone as a yellow solid which did not melt below 320° C. This was purified by recrystallisation from boiling acetic acid in which it was sparingly soluble.

A sample recrystallised from tetrahydrofurfuryl alcohol melted between 332° C. and 335° C.

*Analysis.*—$C_{19}H_{12}O_6$ requires: C, 67.9%; H, 3.57%. Found: C, 67.3%; H, 3.76%.

The sodium salt was formed by warming the acid with an equivalent amount of sodium hydroxide in water, filtering any slight turbidity and freeze-drying the solution to obtain a yellow powder easily soluble in cold water to give a neutral solution.

Example 10

A solution of 5.5 parts khellinone and 5.5 parts dimethyl phthalate in 25 parts dry pyridine was treated with 2.5 parts sodium hydride and heated at about 60° C., with stirring, for six hours. Ether was added and the precipitated solid was filtered, washed with ether, dried and dissolved in water. Acidification of the aqueous solution with hydrochloric acid gave a sticky precipitate. This was filtered, washed with water and then dissolved in 50 parts phosphoric acid at 60–80° C. After 10 minutes the solution was poured into water to obtain a sticky precipitate. This was separated and dissolved in 50 parts boiling acetic acid. On cooling 0.4 part of golden yellow crystals melting between 296° C. and 298° C. were obtained. This appeared to be the dimeric product. The filtrate from these crystals was diluted with water to obtain 5.1 parts of a precipitate melting between 148° C. and 235° C. Several crystallisations from ethanol gave 1.5 parts of yellow crystals of the methyl ester of 2-(2-carboxylphenyl) - 5,8 - dimethoxyfuro[3,2-g]chromone melting between 233° C. and 234° C.

*Analysis.*—$C_{21}H_{16}O_7$ requires: C, 66.3%; H, 4.2%. Found: C, 65.7%; H, 4.1%.

A solution of 0.3 part of this in 10 parts hot dioxan was treated with a solution of 0.3 part sodium hydroxide in methanol. The methanol was boiled off and the precipitate which formed was dissolved by diluting with water. Acidification with hydrochloric acid gave an oily precipitate which solidified on standing. This was recrystallised first from aqueous methanol and then from ethanol to obtain 0.1 part of crystals which melted between 126° C. and 128° C., resolidified at about 130° C. and then melted between 248° C. and 250° C. This indicated that the product was the diketone resulting from opening of the pyrone ring.

Analysis confirmed this.—$C_{20}H_{16}O_8$ requires: C, 62.5%; H, 4.17%. Found: C, 62.7; H, 4.21%.

A sample of this (0.1 part) was heated in an oil-bath at 140° C. until it resolidified. It was then recrystallised from ethanol to obtain 0.04 part 2-(2-carboxyphenyl)-5,8-dimethoxyfuro-[3,2-g]chromone as yellow crystals melting between 246° C. and 248° C.

*Analysis.*—$C_{20}H_{14}O_7$ requires: C, 65.6%; H, 3.8%. Found: C, 65.4%; H, 3.91%.

The sodium salt was prepared from another sample by treating a suspension in water with an exact equivalent of sodium hydroxide solution and freeze-drying the resultant solution.

Example 11

Two parts of the sodium salt of 2-[2-(4-carboxyphenyl)-vinyl]-5,8-dimethoxyfuro-[3,2-g]chromone were heated in a sealed tube with 2 parts methyl iodide and 5 parts methanol at 100° C. for 18 hours. The product was poured into water and the precipitate was filtered, stirred with dilute aqueous sodium hydroxide, again filtered and washed with water. The product was recrystallised from dioxan to obtain 0.4 part of the methyl ester as yellow crystals melting between 312° C. and 315° C.

*Analysis.*—$C_{23}H_{18}O_7$ requires: C, 68.0%; H, 4.43%. Found: C, 67.6%; H, 4.38%.

In a similar way using successively ethyl iodide, n-propyl iodide and n-butyl iodide in place of methyl iodide, the corresponding ethyl ester (melting point 320–325° C.), n-propyl ester (melting point 272–280° C.) and n-butyl ester (melting point 295–298° C.) were prepared.

I claim:

1. A compound selected from furochromone derivatives of the formula:

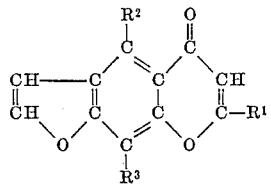

wherein $R^1$ is selected from the group consisting of:
   (a) o-carboxyphenyl, m-carboxyphenyl and p-carboxyphenyl groups;
   (b) o-carboxyphenylalkylene, m-carboxyphenylalkylene and p-carboxyphenylalkylene groups of the formula:

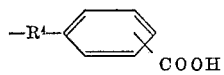

wherein $R^4$ is selected from the group consisting of saturated alkylene groups; $R^2$ is selected from the group consisting of hydroxy, alkoxy, substituted aminoalkoxy and carboxyalkoxy groups: and $R^3$ is selected from the group consisting of hydrogen and lower alkoxy groups; and alkali metal salts, ammonium salts, alkyl esters and glycine amides of those compounds in which $R^1$ contains a carboxyl group.

2. A compound according to claim 1 wherein $R^2$ and $R^3$ are methoxy groups.

3. 2-(4-carboxyphenyl) - 5,8 - dimethoxy-furo[3,2-g] chromone and alkali metal salts, ammonium salts, alkyl esters, and glycine amides thereof.

4. 2 - (4-carboxyphenyl) - 5 - hydroxy-8-methoxy-furo[3,2-g]-chromone and alkali metal salts, ammonium salts, alkyl esters and glycine amides thereof.

5. 2 - [2-(4-carboxyphenyl)-vinyl]-5,8-dimethoxy-furo-[3,2-g]-chromone and alkali metal salts, ammonium salts, alkyl esters and glycine amides thereof.

6. 2 - [2-(3-carboxyphenyl)-vinyl]-5,8-dimethoxy-furo-[3,2-g]-chromone and alkyl metal salts, ammonium salts, alkyl esters and glycine amides thereof.

7. A compound selected from furochromone derivatives of the formula:

wherein $R^1$ is selected from the group consisting of:

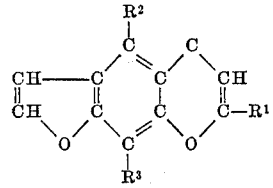

(a) o-carboxyphenyl, m-carboxyphenyl and p-carboxyphenyl groups;
   (b) o-carboxyphenylalkylene, m-carboxyphenylalkylene and p-carboxyphenylalkylene groups of the formula:

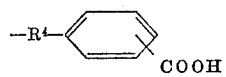

wherein $R^4$ is a vinyl group, $R^2$ is selected from the group consisting of a hydroxy and an alkoxy group and $R^3$ is selected from the group consisting of a hydrogen atom or an alkoxy group; and alkali metal salts, ammonium salts, alkyl esters and glycine amides of those compounds in which $R^1$ contains a carboxyl group.

8. 2 - (4 - carboxyphenyl)-5-methoxyfuro[3,2-g]chromone, and alkali metal salts, ammonium salts, alkyl esters and glycine amides thereof.

References Cited

Schonberg et al. I, J. Am. Chem. Soc. vol. 76, pp. 4576 to 4577 (1954).

Schonberg et al. II, J. Am. Chem. Soc. vol. 77, pp. 5439 to 5440 (1955).

Elsevier, Chemistry of Carbon Compounds vol. IV, part B, pp. 920 to 921, Elsevier Pub. Co. (N.Y.) (1959).

Chemical Abstracts, vol. 51, col. 1946 (1957) (abstract of Musante et al.).

JOHN D. RANDOLPH, Primary Examiner

U.S. Cl. X.R.

260—297, 345.2, 346.2, 999